(12) United States Patent
Yanagida et al.

(10) Patent No.: US 7,678,315 B2
(45) Date of Patent: Mar. 16, 2010

(54) PROCESS FOR PRODUCING ADHESIVE FILM

(75) Inventors: Masami Yanagida, Ootsu (JP);
Hisayasu Kaneshiro, Uji (JP); Takashi Kikuchi, Ootsu (JP); Hiroyuki Tsuji, Yokohama (JP)

(73) Assignee: Kaneka Corporation, Osaka (JP)

( * ) Notice: Subject to any disclaimer, the term of this patent is extended or adjusted under 35 U.S.C. 154(b) by 290 days.

(21) Appl. No.: 11/601,267

(22) Filed: Nov. 17, 2006

(65) Prior Publication Data

US 2007/0158869 A1 Jul. 12, 2007

Related U.S. Application Data

(63) Continuation-in-part of application No. PCT/JP2005/007970, filed on Apr. 27, 2005, now abandoned.

(30) Foreign Application Priority Data

May 18, 2004 (JP) ............................. 2004-148367

(51) Int. Cl.
*B29C 47/06* (2006.01)
(52) U.S. Cl. ............................. 264/173.12; 264/171.1
(58) Field of Classification Search ................. None
See application file for complete search history.

(56) References Cited

U.S. PATENT DOCUMENTS

| 6,251,507 | B1 | 6/2001 | Yamamoto et al. |
| 6,605,366 | B2 | 8/2003 | Yamaguchi et al. |
| 2001/0010860 | A1 | 8/2001 | Yamaguchi et al. |

FOREIGN PATENT DOCUMENTS

| EP | 0 659553 | 6/1995 |
| JP | 07-214637 | 8/1995 |
| JP | 2946416 | 7/1999 |
| JP | 2000-103010 | 4/2000 |
| JP | 2001-205734 | 7/2001 |
| JP | 2001-270036 | 10/2001 |
| JP | 2002-370788 | 12/2002 |
| JP | 2005-131919 | 5/2005 |
| WO | WO2004/055110 | 7/2004 |

OTHER PUBLICATIONS

International Search Report, Aug. 2005, (2 pgs).
JP2001-270036 English Translation (10 pgs).
JP2002-370788 English Translation (9 pgs).
JP2005-131919 English Translation (16 pgs).
Patent Abstracts of Japan, No. 11-099554, Apr. 13, 1999 (1 pg).
Patent Abstracts of Japan, No. 07-214637, Aug. 15, 1995 (1 pg).
English Translation of PCT International Preliminary Report on Patentability, Apr. 27, 2005 (6 pgs).
Ohya, H. et al., Polyimide membranes: applications, fabrications, and properties, CRC Press, 1996.
Bessenov, M.I. et al., Polyamic acids and polyimides, CRC Press, 1993.
Korean Office Action with English Translation, Oct. 30, 2009.

*Primary Examiner*—Monica A Huson
(74) *Attorney, Agent, or Firm*—Kagan Binder, PLLC

(57) ABSTRACT

A process for producing an adhesive film includes laminating an adhesive layer containing thermoplastic polyimide onto at least one surface of a highly heat-resistant polyimide layer by coextrusion casting method, wherein a chemical dehydrator and a catalyst are contained in a precursor solution of the highly heat-resistant polyimide and/or a solution containing either the thermoplastic polyimide or a precursor of the thermoplastic polyimide.

13 Claims, No Drawings

PROCESS FOR PRODUCING ADHESIVE FILM

This is a continuation-in-part of International Application PCT/JP2005/007970, with an international filing date of Apr. 27, 2005, now abandoned, the contents of which are incorporated herein by reference.

BACKGROUND OF THE INVENTION

1. Field of Invention

The present invention relates to an adhesive film including an adhesive layer containing a thermoplastic polyimide on at least one surface of a highly heat-resistant polyimide layer.

2. Description of the Related Art

In recent years, demands for various printed circuit boards have been growing with the development of electronic products each having reduced weight, smaller size, and higher density. In particular, demands for flexible laminates (also referred to as "flexible printed circuit boards (FPCs)") have been growing. In general, each of the flexible laminates includes a circuit composed of a metal foil on an insulating film.

A typical method for producing a flexible laminate, which is generally composed of various insulating materials, includes bonding a metal foil onto a surface of a substrate, which is a flexible insulating film, using an adhesive material selected from various adhesives by thermocompression bonding. The insulating film is preferably a polyimide film or the like. The adhesive material is typically a thermosetting adhesive, such as an epoxy or acrylic adhesive. Hereinafter, an FPC made using a thermosetting adhesive is also referred to as "three-layer FPC".

Thermosetting adhesives are advantageous in that they realize bonding at relatively low temperatures. However, since the demands for higher properties, such as heat resistance, flexibility, and electrical reliability, are increasing, the three-layer FPC using the thermosetting adhesive may not be able to meet these stringent requirements. To overcome this difficulty, an FPC that includes a metal layer directly disposed on an insulating film or that uses a thermoplastic polyimide in the bonding layer (hereinafter this FPC is also referred to as "two-layer FPC") has been proposed. The two-layer FPCs have more desirable properties than the three-layer FPCs and the demands for two-layer FPCs are expected to grow in the future.

Examples of a method for making the flexible metal-clad laminate used in a two-layer FPC include a cast method in which a polyamic acid functioning as a precursor of a polyimide is flow-cast or applied on a metal foil and is then imidized, a metallizing method in which a metal layer is directly formed on a polyimide film by sputtering or plating, and a lamination method in which a polyimide film is bonded to a metal foil with the thermoplastic polyimide. Among these methods, the lamination method is superior to the others in that the range of the thickness of the metal foil usable in this method is wider than that in the cast method and that the equipment cost is lower than that of the metallizing method. Examples of the equipment for the lamination include a hot roll laminator and a double belt press machine that can continuously conduct lamination while unreeling a roll material.

An adhesive film containing a polyimide film having a thermoplastic polyimide layer on at least one surface of the polyimide film has been widely used as a substrate material for the lamination method. Examples of a method for producing the adhesive film containing a polyimide base film include a coating method for coating a thermoplastic polyimide solution or a solution of a precursor of the thermoplastic polyimide onto one or both surfaces of the polyimide base film and drying the solution; a thermal lamination method for bonding a thermoplastic polyimide film onto at least one surface of the base polyimide film under heating; and a coextrusion casting method for casting a polyimide base layer and a thermoplastic polyimide layer at the same time (for example, see Japanese Patent No. 2946416 and Japanese Unexamined Patent Application Publication No. 7-214637). Among these methods, the coextrusion casting method advantageously has productivity and yield higher than those of other methods because the number of steps required is small. However, a conventional coextrusion casting method is required to include a thermal cure step in which imidization is substantially performed by only heating. The thermal cure step disadvantageously has low productivity due to a significantly long time required for imidization and removal by evaporation of a solvent in forming a film. The low productivity leads to an increase in total cost. Thus, by employing the conventional coextrusion casting method, adhesive films are not always provided in cost demanded in the market.

SUMMARY OF THE INVENTION

The present invention is accomplished in view of the above-described problems. It is an object of the present invention to provide a process for producing an adhesive film in dramatically high productivity compared with that of a conventional method.

As a result of intensive research, the present inventors independently found a process for producing an adhesive film in high productivity. This finding resulted in the completion of the present invention.

The present invention relates to a process for producing an adhesive film, the process including laminating an adhesive layer containing a thermoplastic polyimide onto at least one surface of a highly heat-resistant polyimide layer by coextrusion casting method, wherein a chemical dehydrator and a catalyst are contained in a precursor solution of the highly heat-resistant polyimide and/or a solution containing the thermoplastic polyimide or a solution containing a precursor of the thermoplastic polyimide.

It has surprisingly been discovered that the coefficient of thermal expansion (CTE) of polyimide laminates can be controlled by adjusting the amount of chemical dehydrator and catalyst in each of the plural layers. Thus, one can take starting materials comprising polyamic acid polymers of the laminate that are identical, and provide polyimide laminates that are different in CTE simply by adding different amounts of chemical dehydrator and catalyst in each of the plural layers.

Because the CTE can be controlled simply by manipulating the amount of chemical dehydrator and catalyst in each of the plural layers, the manufacturer is provided through the present process with flexibility in fine preparation, such as matching the polyimide film laminate's CTE to the CTE of a metal foil to which the laminate will be laminated. Preferred such metal foils comprise copper. This matching provides exceptional dimensional stability in the resulting FPC, which leads, for example, to the prevention of curling of the flexible circuit during temperature cycling.

In an embodiment of the present invention, a process is provided for producing an adhesive film laminate comprising at least one a highly heat-resistant polyimide layer and at least one thermoplastic polyimide, the laminate being prepared within predetermined thickness parameters for the layers, and the laminate having a target predetermined coefficient of thermal expansion. This process comprises the steps of a) identifying a target predetermined coefficient of thermal expansion for the adhesive film laminate;

b) formulating a precursor of a thermoplastic polyimide or a solution containing a thermoplastic polyimide;

c) formulating a precursor of a highly heat-resistant polyimide;

d) based on the formulations in steps b) and c) and the predetermined thickness parameters of the layers, formulating an amount of a chemical dehydrator and a catalyst to be contained in the precursor solution of the highly heat-resistant polyimide and/or the solution containing either the thermoplastic polyimide or a precursor of the thermoplastic polyimide to provide an adhesive film laminate having the target predetermined coefficient of thermal expansion for the adhesive film laminate; and e) laminating at least one adhesive layer comprising a thermoplastic polyimide onto at least one surface of a highly heat-resistant polyimide layer by coextrusion casting the precursor solution of the highly heat-resistant polyimide and the solution containing either the thermoplastic polyimide or a precursor of the thermoplastic polyimide as formulated in step d).

In a preferred embodiment related to the process for producing the adhesive film described above, 0.5 to 5 mol of the chemical dehydrator is contained per mole of the amic acid unit of a polyamic acid in the solution containing the chemical dehydrator and optionally the catalyst or, in the case where a thermoplastic polyimide is charged into the extruder, 0.5 to 5 mol of the chemical dehydrator is contained per mole of the imide unit of a thermoplastic polyimide in the solution containing the chemical dehydrator and optionally the catalyst.

In another preferred embodiment related to the process for producing the adhesive film described above, 0.05 to 3 mol of the catalyst is contained per mole of the amic acid unit of a polyamic acid in the solution containing the catalyst and optionally the chemical dehydrator or, in the case where a thermoplastic polyimide is charged into the extruder, 0.05 to 3 mol of the catalyst is contained per mole of the imide unit of a thermoplastic polyimide in the solution containing the catalyst and optionally the chemical dehydrator.

According to the process of the present invention, it is possible to dramatically improve productivity of an adhesive film compared with that of a conventional method and to provide the adhesive film at low cost.

DESCRIPTION OF THE PREFERRED EMBODIMENTS

Embodiments of the present invention will be described below.

An adhesive film of the present invention includes an adhesive layer containing a thermoplastic polyimide on at least one surface of a highly heat-resistant polyimide layer.

The highly heat-resistant polyimide layer may be composed of various polyimide materials but is preferably resistant to thermal deformation in a step of processing the resulting adhesive film or at a temperature generally exposed in the form of a final product. In particular, the polyimide layer preferably contains 90 percent by weight of a non-thermoplastic polyimide resin. The molecular structure and thickness of the polyimide layer are not particularly limited.

An exemplary embodiment will be described below.

As a process for producing a polyamic acid functioning as a precursor of the highly heat-resistant polyimide used in the present invention, any known process for producing the polyamic acid may be employed. In general, the polyamic acid is prepared by dissolving substantially equimolar amounts of an aromatic acid dianhydride and an aromatic diamine in an organic solvent and stirring the resulting solution at a controlled temperature until the polymerization of the acid dianhydride and the diamine is completed. The resulting polyamic acid solution has typically a concentration of 5 to 35 percent by weight and preferably 10 to 30 percent by weight. At a concentration within this range, an adequate molecular weight and an appropriate solution viscosity can be easily obtained.

Any known polymerization process or a combination of known polymerization processes may be employed. The polymerization process for a polyamic acid is characterized by the order of addition of monomers. By controlling the order of addition of monomers, the physical properties of the resulting high heat-resistant polyimide can be controlled. In the present invention, any process for adding a monomer may be employed in the polymerization of the polyamic acid. Typical polymerization processes are as follows:

(1) A process including dissolving an aromatic diamine in a polar organic solvent and polymerizing the aromatic diamine with a substantially equimolar amount of an aromatic tetracarboxylic dianhydride;

(2) A process including reacting an aromatic tetracarboxylic dianhydride and fewer moles of an aromatic diamine in a polar organic solvent to prepare a prepolymer having acid anhydride groups at the both ends and polymerizing the prepolymer with an aromatic diamine so that the aromatic tetracarboxylic dianhydride and the aromatic diamine are substantially equimolar in the whole process;

(3) A process including reacting an aromatic tetracarboxylic dianhydride and excess moles of an aromatic diamine in a polar organic solvent to prepare a prepolymer having amino groups at the both ends, adding an additional aromatic diamine to the prepolymer, and then polymerizing the prepolymer with an aromatic tetracarboxylic dianhydride so that the aromatic tetracarboxylic dianhydride and the aromatic diamine are substantially equimolar in the whole process;

(4) A process including dissolving and/or dispersing an aromatic tetracarboxylic dianhydride in a polar organic solvent and polymerizing the aromatic tetracarboxylic dianhydride with a substantially equimolar amount of an aromatic diamine; and (5) A process including reacting a substantially equimolar mixture of an aromatic tetracarboxylic dianhydride and an aromatic diamine in a polar organic solvent to perform polymerization.

Any one or combination of these processes may be employed.

In the present invention, any polyamic acid prepared by any process described above may be used. The polymerization process is not particularly limited.

To produce a highly heat-resistant polyimide layer having physical properties suitable for use in an adhesive film according to the present invention, it is preferred to employ a polymerization process for producing a prepolymer using a diamine component having a rigid structure, for example, p-phenylenediamine or a substituted benzidine. By employing this process, a polyimide film having a high elastic modulus and a low coefficient of hygroscopic expansion can be easily produced. In this process, the molar ratio between a diamine and an acid dianhydride used in preparing a prepolymer is preferably in a range of 100:70 to 100:99 and more preferably 100:75 to 100:90 or is preferably in the range of 70:100 to 99:100 and more preferably 75:100 to 90:100. The content of the diamine below the above range may result in reducing the stability of the prepolymer. The content of the diamine exceeding the above range may disadvantageously result in a viscosity that is too high. Materials suitably used for a polyamic acid composition functioning as a precursor of a highly heat-resistant polyimide according to the present invention will be described.

Examples of appropriate acid anhydride suitably used for the present invention include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 4,4'-oxyphthalic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl) sulfone dianhydride, p-phenylenebis(trimellitic monoester anhydride), ethylenebis(trimellitic monoester anhydride), bisphenol-A bis(trimellitic mono ester anhydride), and analogues thereof. These may be used alone or in combination at any desired mixing ratio.

To produce the highly heat-resistant polyimide layer having physical properties suitable for the adhesive film according to the present invention, among these acid dianhydrides, pyromellitic dianhydride, 3,3',4,4'-benzophenonetetracarboxylic dianhydride, 4,4'-oxyphthalic dianhydride, and/or 3,3',4,4'-biphenyltetracarboxylic dianhydride are preferably used.

When at least one dianhydride selected from 3,3',4,4'-benzophenonetetracarboxylic dianhydride and 4,4'-oxyphthalic dianhydride among these acid dianhydrides is used, the content is preferably 60 mol % or less, preferably 55 mol % or less, and more preferably 50 mol % or less for the total of the acid dianhydride. When at least one dianhydride selected from 3,3',4,4'-benzophenonetetracarboxylic dianhydride and 4,4'-oxyphthalic dianhydride is contained in an amount exceeding this range, the glass transition temperature of the resulting highly heat-resistant polyimide layer may be excessively decreased or the high-temperature storage modulus may be excessively decreased, thereby making the film production difficult.

When a pyromellitic dianhydride is used, the amount used is preferably 40 to 100 mol %, more preferably 45 to 100 mol %, and most preferably 50 to 100 mol %. When the pyromellitic dianhydride is used in an amount within this range, the glass transition temperature and the high-temperature storage modulus can be easily adjusted within a range suitable for use or the film production.

Examples of an appropriate diamine suitably used for the composition of polyamic acid functioning as a precursor of the highly heat-resistant polyimide according to the present invention include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenyl sulfone, 4,4'-diaminodiphenyl sulfone, 4,4'-oxydianiline, 3,3'-oxydianiline, 3,4'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methylamine, 4,4'-diaminodiphenyl-N-phenylamine, 1,4-diaminobenzene(p-phenylenediamine), 1,3-diaminobenzene, 1,2-diaminobenzene, bis[4-(4-aminophenoxy)phenyl]sulfone, bis[4-(3-aminophenoxy)phenyl]sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 1,3-bis(4-aminophenoxy)benzene, 1,3-bis(3-aminophenoxy)benzene, 3,3'-diaminobenzophenone, 4,4'-diaminobenzophenone, and analogues thereof.

The diamines are classified into rigid structure-containing diamines, for example, diaminobenzenes and benzidines, and flexible structure-containing diamines, for example, an ether group, a sulfone group, a ketone group, or a sulfide group. The molar ratio of the rigid structure-containing diamine to the flexible structure-containing diamine is 80/20 to 20/80, preferably 70/30 to 30/70, and particularly preferably 60/40 to 30/70. The content of the rigid structure-containing diamine exceeding the above range may result in a tendency to decrease the tensile elongation of the resulting layer. The content of the rigid structure-containing diamine below the above range may result in an excessively low glass transition temperature or excessively low storage modulus at a high temperature, thus making the film production difficult.

The highly heat-resistant polyimide layer used in the present invention is not limited to the above-described range. The highly heat-resistant polyimide layer is preferably produced by appropriately selecting the types and compounding ratio of the aromatic acid dianhydride and the aromatic diamine within the ranges described above so that the resulting polyimide layer has desired physical properties.

Any solvent that dissolves the polyamic acid may be used for the synthesis of the polyamic acid. Examples thereof include sulfoxide solvents such as dimethyl sulfoxide and diethyl sulfoxide; formamide solvents such as N,N-dimethylformamide and N,N-diethylformamide; acetamide solvents such as N,N-dimethylacetamide and N,N-diethylacetamide; pyrrolidone solvents such as N-methyl-2-pyrrolidone and N-vinyl-2-pyrrolidone; phenol solvents such as phenol, o-, m-, or p-cresol, xylenol, halogenated phenol, and catechol; ether solvents such as tetrahydrofuran, dioxane, and dioxolane; alcohol solvents such as methanol, ethanol, and butanol; cellosolve solvents such as butyl cellosolve; and other solvents such as hexamethylphosphoramide and γ-butyrolactone. These may be used alone or in combination. In addition, aromatic hydrocarbons such as xylene and toluene may be used. Among these, a formamide solvent, such as N,N-dimethylformamide or N,N-diethylformamide is particularly preferably used. Water is preferably removed as much as possible because water accelerates the decomposition of the polyamic acid.

In order to improve various characteristics, for example, slidability, thermal conductivity, electrical conductivity, corona resistance, and loop stiffness, of the film, a filler may be incorporated. Any filler may be used. Suitable examples thereof include silica, titanium oxide, alumina, silicon nitride, boron nitride, calcium hydrogen phosphate, calcium phosphate, and mica.

The particle size of the filler is determined depending on film characteristics to be modified and the type of filler to be added and is thus not particularly limited. A typical average particle size is 0.05 to 100 μm, preferably 0.1 to 75 μm, more preferably 0.1 to 50 μm, and most preferably 0.1 to 25 μm. When the average particle size is below this range, the modification effect is less likely to exhibit. When the average particle size exceeds this range, the surface property may be significantly impaired or the mechanical properties may be greatly degraded. Furthermore, the number of parts of the filler added is determined depending on, for example, the film characteristics and the particle size of the filler and is thus not particularly limited. In general, the amount of filler added is 0.01 to 100 parts by weight, preferably 0.01 to 90 parts by weight, and more preferably 0.02 to 80 parts by weight for 100 parts by weight of the polyimide. When the amount of filler is below this range, the modification effect of the filler is less likely to exhibit. When the amount of filler exceeds the range, the mechanical properties of the resulting film may be greatly degraded. The filler may be incorporated by any process. Typical addition processes are as follows:

1. process of adding a filler into a polymerization reaction mixture before polymerization or during polymerization;

2. process of kneading a mixture of a filler and the polymer after completion of the polymerization with a roll mill including three rollers or the like; and 3. A process of preparing a dispersion containing a filler and mixing the dispersion with an organic solvent solution containing a polyamic acid.

The process of mixing the dispersion containing the filler with the polyamic acid solution, in particular, immediately before the film production, is preferable because of the least contamination with the filler in the production line. When the dispersion containing the filler is prepared, the same solvent as that used for the polymerization of the polyamic acid is preferably used. Furthermore, in order to satisfactorily disperse the filler and stabilize the dispersion state, a dispersant, a viscosity improver, and the like may be used to such an extent that does not adversely affect the physical properties of the resulting film.

As a thermoplastic polyimide contained in the adhesive layer, a thermoplastic polyimide, a thermoplastic polyamide-imide, a thermoplastic polyetherimide, a thermoplastic polyesterimide, or the like may be suitably used. Among these, from the standpoint of low hygroscopic property, the thermoplastic polyesterimide is particularly suitably used.

From the standpoint that lamination can be performed with an existing apparatus and the heat resistance of the resulting metal-clad laminate is not impaired, the thermoplastic polyimide of the present invention preferably has a glass transition temperature (Tg) of 150° C. to 300° C. The Tg is determined from the inflection point of the storage modulus measured by a dynamic mechanical analyzer (DMA).

The polyamic acid functioning as a precursor of the thermoplastic polyimide is not particularly limited. Any known polyamic acid may be used. With respect to the production of the polyamic acid, commonly known materials, reaction conditions, etc., may be used (for example, see Examples described below). An inorganic or organic filler may be incorporated as required.

The coextrusion casting process according to the present invention is a film-forming process including the steps of simultaneously charging a precursor solution of a highly heat-resistant polyimide and a solution containing a thermoplastic polyimide or a solution containing a precursor of the thermoplastic polyimide into an extruder having an extrusion die for forming at least two layers and extruding the both solutions from the discharging outlets of the die into a thin film including at least two layers. A typical process will be described below. The both solutions are continuously extruded onto a flat and smooth support from the extrusion die for at least two layers. Then, the solvent in the thin film containing the multiple layers is at least partially evaporated to form a self-supporting multilayer film. The multilayer film is separated from the support. The multilayer film is sufficiently heated at a high temperature of 250° C. to 600° C. to substantially remove the solvent and allow imidization to proceed, thereby forming the target adhesive film. In order to improve melt flowability of the adhesive layer, intentionally, the imidization ratio may be decreased and/or the solvent may be allowed to remain.

A method for evaporating the solvents in the precursor solution of the highly heat-resistant polyimide and the solution containing the thermoplastic polyimide or the solution containing the precursor of the thermoplastic polyimide that have been extruded from the extrusion die for at least two layers is not particularly limited. A method of heating and/or air blasting is the simplest way. Excessively high heating temperatures result in rapid evaporation of the solvent to leave evaporation marks, thus causing generation of minute defects in the final adhesive film. Therefore, the heating temperature is preferably less than 50° C. higher than the boiling point of the solvent used.

As the extrusion die for at least two layers, any of dies having various structures may be used. For example, T-dies for forming a film including a plurality of layers may be used. Any of known dies having various structures may be suitably used. Particularly suitable examples thereof include a feed block T-die and a multi-manifold T-die.

In a process for producing the adhesive film according to the present invention, it is essential for the precursor solution of the highly heat-resistant polyimide and/or the solution containing the thermoplastic polyimide or a solution containing the precursor of the thermoplastic polyimide to contain a chemical dehydrator and a catalyst. Hereinafter, such a process is referred to as "chemical cure process". In general, a polyimide is prepared by dehydration and conversion of a polyamic acid functioning as a precursor of the polyimide. The conversion process can be categorized into two: a thermal cure process including performing conversion by only heating and a chemical cure process using a chemical dehydrator. Employing the chemical cure process in the present invention results in dramatically high productivity in preparing the polyimide resin compared with productivity obtained by employing the thermal cure process.

It has surprisingly been found that the chemical dehydrator and the catalyst can be located in precursors (or thermoplastic polyimide) and solutions for forming the various layers of the ultimate laminate in many configurations as these precursors and solutions are charged into the extruder. For example, in an embodiment of the present invention, the material coextruded with the precursor solution of the highly heat-resistant polyimide is a precursor of the thermoplastic polyimide. An aspect of this embodiment provides that the precursor solution of the highly heat-resistant polyimide contains the catalyst and does not contain the chemical dehydrator, and the precursor of the thermoplastic polyimide contains both the chemical dehydrator and the catalyst. Another aspect of this embodiment provides that the precursor solution of the highly heat-resistant polyimide contains both the chemical dehydrator and the catalyst, and the precursor of the thermoplastic polyimide contains the catalyst and does not contain the chemical dehydrator. In another embodiment of the present invention, the material coextruded with the precursor solution of the highly heat-resistant polyimide is a solution of the thermoplastic polyimide. An aspect of this embodiment provides that the precursor solution of the highly heat-resistant polyimide contains the catalyst and does not contain the chemical dehydrator, and the solution of the thermoplastic polyimide contains both the chemical dehydrator and the catalyst. Another aspect of this embodiment provides that the precursor solution of the highly heat-resistant polyimide does not contain the catalyst or the chemical dehydrator, and the solution of the thermoplastic polyimide contains both the chemical dehydrator and the catalyst.

Preferably, the catalyst and the chemical dehydrator are present in the materials as charged into the extruder as a whole in an amount effective to facilitate conversion of the amic acid units of the precursors to imide units. While not being bound by theory, it is believed that the catalyst and/or the chemical dehydrator migrates from one material to another during the extrusion process, thereby facilitating the desired imide formation reaction.

As the chemical dehydrator according to the present invention, cyclodehydrating agents for various polyamic acids may be used. Examples of the cyclodehydrating agents suitably used include aliphatic acid anhydrides, aromatic acid anhydrides, N,N'-dialkylcarbodiimides, lower aliphatic halides, halogenated lower aliphatic acid anhydrides, arylsulfonic acid dihalides, thionyl halides, and a mixture of two or more thereof. Among these, the aliphatic acid anhydride and the aromatic acid anhydride act satisfactorily. The term "catalyst" refers to a component having the effect of promoting the cyclodehydration due to the chemical dehydrator for the polyamic acid. Examples of the catalyst usable include aliphatic tertiary amines, aromatic tertiary amines, and heterocyclic tertiary amines. Among these, a nitrogen-containing heterocyclic compound, such as imidazole, benzimidazole, isoquinoline, quinoline, or β-picoline, is particularly preferable.

The amount of the chemical dehydrator is 0.5 to 5 mol and preferably 0.7 to 4 mol per mole of an amic acid unit in the polyamic acid contained in a solution containing the chemical dehydrator and the catalyst. The amount of the catalyst is 0.05 to 3 mol and preferably 0.2 to 2 mol per mol of an amic acid unit in the polyamic acid contained in a solution containing the chemical dehydrator and the catalyst. The amounts of the dehydrator and the catalyst below the above range result in unsatisfactory chemical imidization, thus causing breakage during baking and a reduction in mechanical strength, in some cases. The amounts of the dehydrator and the catalyst exceeding the above range cause excessively rapid imidization, thus resulting in difficulty in casting in the form of a film.

An example of a preferred embodiment of the present invention is a metal-clad laminate produced by bonding the adhesive film with a metal foil on at least one surface of the adhesive film by the lamination method. In view of stability in dimensions of the film bonded with the metal foil on at least one surface of the film, i.e., the flexible metal-clad laminate, the thermal expansion coefficient of the adhesive film is preferably adjusted in the range of 4 to 30 ppm/° C., preferably 6 to 25 ppm/° C., and most preferably 8 to 22 ppm/° C. at 50° C. to 200° C. When the thermal expansion coefficient of the polyimide film exceeds the above range, the thermal expansion coefficient of the adhesive film including an adhesive layer is excessively higher than that of the metal foil. As a result, a difference in the thermal behavior between the adhesive film and the metal foil during lamination is increased, thereby increasing a change in dimensions of the resulting flexible metal-clad laminate, in some cases. When the thermal expansion coefficient of the polyimide film is below the above range, the thermal expansion coefficient of the adhesive film is excessively lower than that of the metal foil. As a result, a difference in the thermal behavior between the adhesive film and the metal foil during lamination is increased, thereby increasing a change in dimensions of the resulting flexible metal-clad laminate, in some cases.

Each of the thicknesses of the layers constituting the adhesive film should be appropriately adjusted so that the total thickness is suitably set for the application. The module of elasticity in tension of the resulting adhesive film in the longitudinal direction and width direction are preferably 5.0 to 11 GPa and more preferably 5.5 to 10 GPa. When the module of elasticity in tension are below the above range, the adhesive film is susceptible to tension during lamination. As a result, thermal stresses that are different in the machine direction (MD) and transverse direction (TD) occur, thereby increasing a change in dimensions of the resulting flexible metal-clad laminate, in some cases. On the contrary, when the module of elasticity in tension exceed the above range, the resulting flexible metal-clad laminate may have poor flexibility. In general, the modulus of elasticity in tension of the adhesive layer is lower than that of the highly heat-resistant polyimide layer. Thus, the modulus of elasticity in tension of the adhesive film tends to decrease with an increase in the ratio of the adhesive layer to the highly heat-resistant polyimide layer.

An increase in the difference in thermal expansion coefficient between the adhesive film and the metal foil bonded results in an increase in the difference in the behavior of expansion and shrinkage during lamination. As a result, strain remains in the resulting flexible metal-clad laminate, thus increasing a change in dimensions after removal of the metal foil, in some cases. The thermal expansion coefficient of the adhesive film is preferably adjusted so that the thermal expansion coefficient is within a range of plus/minus 6 ppm/° C. of the thermal expansion coefficient of the metal foil at 200° C. to 300° C. The thermal expansion coefficient of the adhesive film can be adjusted by changing the thickness ratio of the highly heat-resistant polyimide layer and the adhesive layer, and surprisingly also by changing the amount of catalyst and chemical dehydrator present as the laminate is prepared, as discussed above.

The metal foil is not particularly limited. Examples of the metal foil in the inventive flexible metal-clad laminate used in electronic devices and electrical equipment include foils composed of copper and alloys thereof; stainless steel and alloys thereof; nickel and alloys thereof (including 42 alloy); and aluminum and alloys thereof. In typical flexible metal-clad laminates, copper foils, such as rolled copper foils and electrolytic copper foils, are often used and are suitably used in the present invention. The metal foil may include a rust-proofing layer, a heat-resistant layer, or an adhesive layer formed by application on a surface of the metal foil.

EXAMPLES

A process for producing an adhesive film according to the present invention will now be described in detail based on Examples.

Synthesis Example 1

Synthesis of Polyamic Acid Functioning as Precursor of Highly Heat-Resistant Polyimide After 6.9 kg of 4,4'-oxydianiline (hereinafter, also referred to as "ODA"), 6.2 kg of p-phenylenediamine (hereinafter, also referred to as "p-PDA"), and 9.4 kg of 2,2-bis[4-(4-aminophenoxy)phenyl]propane (hereinafter, also referred to as "BAPP") were dissolved in 239 kg of N,N-dimethylformamide (hereinafter, also referred to as "DMF") that had been cooled to 10° C., 10.4 kg of pyromellitic dianhydride (hereinafter, also referred to as "PMDA") was added thereto. The resulting mixture was stirred for 1 hour to dissolve PMDA, and then 20.3 kg of benzophenonetetracarboxylic dianhydride (hereinafter, also referred to as "BTDA") was added thereto. The resulting mixture was stirred for 1 hour to dissolve BTDA.

A DMF solution containing PMDA (PMDA:DMF=0.9 kg:7.0 kg) that had been prepared separately was gradually added to the reaction mixture until the viscosity reached about 3,000 poise. The resulting solution was stirred for 1 hour to prepare a polyamic acid solution functioning as a precursor of a highly heat-resistant polyimide. The resulting polyamic acid solution had a solid content of 18 percent by weight and a rotational viscosity of 3,500 poise at 23° C.

Synthesis Example 2

Synthesis of Polyamic acid Functioning as Precursor of Highly Heat-Resistant Polyimide After 12.6 kg of ODA and 6.8 kg of p-PDA were dissolved in 239 kg of DMF that had been cooled to 10° C., 15.6 kg of PMDA was added thereto. The resulting mixture was stirred for 1 hour to dissolve PMDA. Then, 12.2 kg of BTDA was added thereto. The resulting mixture was stirred for 1 hour to dissolve BTDA. Then, 5.8 kg of p-phenylenebis(trimellitic monoester anhydride) (hereinafter, also referred to as "TMHQ") was added thereto. The resulting mixture was stirred for 2 hours to dissolve TMHQ.

A DMF solution containing PMDA (PMDA:DMF=0.9 kg:7.0 kg) that had been prepared separately was gradually added to the reaction mixture until the viscosity reached about 3,000 poise. The resulting solution was stirred for 1 hour to prepare a polyamic acid solution functioning as a precursor of a highly heat-resistant polyimide. The resulting polyamic acid solution had a solid content of 18 percent by weight and a rotational viscosity of 3,500 poise at 23° C.

Synthesis Example 3

Synthesis of Polyamic Acid Functioning as Precursor of Highly Heat-Resistant Polyimide After 4.9 kg of ODA and 22.3 kg of 4,4'-diaminobenzanilide (hereinafter, also referred to as "DABA") were dissolved in 221 kg of DMF that had been cooled to 10° C., 26.0 kg of PMDA was added thereto. The resulting mixture was stirred for 1 hour to dissolve PMDA.

A DMF solution containing PMDA (PMDA:DMF=0.80 kg: 10.0 kg) that had been prepared separately was gradually added to the reaction mixture until the viscosity reached about 3,000 poise. The resulting solution was stirred for 1 hour to prepare a polyamic acid solution functioning as a precursor of a highly heat-resistant polyimide. The resulting polyamic acid solution had a solid content of 18 percent by weight and a rotational viscosity of 3,500 poise at 23° C.

Synthesis Example 4

Synthesis of Polyamic Acid Functioning as Precursor of Highly Heat-Resistant Polyimide After 21.1 kg of ODA was dissolved in 187 kg of DMF that had been cooled to 10° C., 30.6 kg of PMDA was added thereto. The resulting mixture was stirred for 1 hour to dissolve PMDA. Then, 3.78 kg of p-PDA was added thereto. The resulting mixture was stirred for 1 hour to dissolve p-PDA.

A DMF solution containing p-PDA (p-PDA:DMF=3.78 kg:38.0 kg) that had been prepared separately was gradually added to the reaction mixture until the viscosity reached about 3,000 poise. The resulting solution was stirred for 1 hour to prepare a polyamic acid solution functioning as a precursor of a highly heat-resistant polyimide. The resulting polyamic acid solution had a solid content of 18 percent by weight and a rotational viscosity of 3,400 poise at 23° C.

Synthesis Example 5

Synthesis of Polyamic Acid Functioning as Precursor of Highly Heat-Resistant Polyimide After 25.8 kg of ODA was dissolved in 236 kg of DMF that had been cooled to 10° C., 27.4 kg of PMDA was added thereto. The resulting mixture was stirred for 1 hour to dissolve PMDA.

A DMF solution containing PMDA (PMDA:DMF=0.90 kg: 10.2 kg) that had been prepared separately was gradually added to the reaction mixture until the viscosity reached about 3,000 poise. The resulting solution was stirred for 1 hour to prepare a polyamic acid solution functioning as a precursor of a highly heat-resistant polyimide. The resulting polyamic acid solution had a solid content of 18 percent by weight and a rotational viscosity of 3,400 poise at 23° C.

Synthesis Example 6

Synthesis of Polyamic Acid Functioning as Precursor of Thermoplastic Polyimide

To a 2,000-ml glass flask, 780 g of DMF and 117.2 g of bis[4-(4-aminophenoxy)phenyl]sulfone (hereinafter, also referred to as "BAPS") were charged. Then, 71.7 g of 3,3',4,4'-biphenyltetracarboxylic dianhydride (hereinafter, also referred to as "BPDA") was gradually added to the resulting mixture under stirring in a nitrogen atmosphere. Subsequently, 5.6 g of 3,3',4,4'-ethylene glycol dibenzoate tetracarboxylic dianhydride (hereinafter, also referred to as "TMEG") was added thereto. The resulting mixture was stirred for 30 minutes in an ice bath. Separately, 5.5 g of TMEG was dissolved in 20 g of DMF to prepare a solution. The resulting solution was gradually added to the reaction solution under stirring while monitoring the viscosity. When the viscosity reached 3,000 poise, the addition and stirring were stopped to prepare a polyamic acid solution functioning as a precursor of a thermoplastic polyimide.

Synthesis Example 7

Synthesis of Polyamic Acid Functioning as Precursor of Thermoplastic Polyimide

To a 2,000-ml glass flask, 780 g of DMF and 115.6 g of 2,2-bis[4-(4-aminophenoxy)phenyl]propane (BAPP) were charged. Then, 78.7 g of 3,3',4,4'-biphenyltetracarboxylic dianhydride (BPDA) was gradually added thereto under stirring in a nitrogen atmosphere. Subsequently, 3.8 g of ethylenebis(trimellitic monoester anhydride) (TMEG) was added thereto. The resulting mixture was stirred for 30 minutes in an ice bath. Separately, 2.0 g of TMEG was dissolved in 20 g of DMF to prepare a solution. The resulting solution was added gradually to the reaction mixture under stirring while monitoring the viscosity. When the viscosity reached 3,000 poise, the addition and stirring were stopped to prepare a polyamic acid solution functioning as a precursor of a thermoplastic polyimide.

Example 1

The following chemical dehydrator and catalyst were added to the polyamic acid solution functioning as the precursor of the highly heat-resistant polyimide prepared in Synthesis example 1:

1. Chemical dehydrator: 2 mol of acetic anhydride per mole of the amic acid unit of the polyamic acid functioning as the precursor of the highly heat-resistant polyimide; and 2. Catalyst: 1 mol of isoquinoline per mole of the amic acid unit of the polyamic acid functioning as the precursor of the highly heat-resistant polyimide.

The following chemical dehydrator and catalyst were added to the polyamic acid solution functioning as the precursor of the thermoplastic polyimide prepared in Synthetic example 6:

1. Chemical dehydrator: 2 mol of acetic anhydride per mole of the amic acid unit of the polyamic acid functioning as the precursor of the thermoplastic polyimide; and 2. Catalyst: 2 mol of isoquinoline per mole of the amic acid unit of the polyamic acid functioning as the precursor of the thermoplastic polyimide.

Then, the resulting polyamic acid solutions were continuously extruded from a three-layer multi-manifold T-die and cast onto a moving stainless-steel endless belt, which was disposed 20 mm under the T-die, so that the outer layers were composed of the polyamic acid solution functioning as the precursor of the thermoplastic polyimide and the inner layer was composed of the polyamic acid solution functioning as the precursor of the highly heat-resistant polyimide. The resulting resin film was heated at 130° C. for 100 seconds to form a self-supporting gel film. The resulting self-supporting gel film was separated from the endless belt and fixed with tenter clips. The fixed gel film was dried and imidized at 300° C. for 30 seconds, at 400° C. for 50 seconds, and at 450° C. for 10 seconds to produce an adhesive film including thermoplastic polyimide layers each having a thickness of 4 µm and a highly heat-resistant polyimide layer having a thickness of 17 µm.

Example 2

An adhesive film was produced as in Example 1, except that the polyamic acid solution functioning as the precursor of the highly heat-resistant polyimide prepared in Synthesis example 3 was used instead of the polyamic acid solution functioning as the precursor of the highly heat-resistant polyimide prepared in Synthesis example 1.

Example 3

An adhesive film was produced as in Example 1, except that the polyamic acid solution functioning as the precursor of the highly heat-resistant polyimide prepared in Synthesis example 4 was used instead of the polyamic acid solution functioning as the precursor of the highly heat-resistant polyimide prepared in Synthesis example 1.

Example 4

An adhesive film was produced as in Example 1, except that the polyamic acid solution functioning as the precursor of the highly heat-resistant polyimide prepared in Synthesis example 5 was used instead of the polyamic acid solution functioning as the precursor of the highly heat-resistant polyimide prepared in Synthesis example 1.

Example 5

An adhesive film was produced as in Example 1, except that the polyamic acid solution functioning as the precursor of the thermoplastic polyimide prepared in Synthesis example 7 was used instead of the polyamic acid solution functioning as the precursor of the thermoplastic polyimide prepared in Synthesis example 6.

Example 6

The following catalyst was added to the polyamic acid solution functioning as the precursor of the highly heat-resistant polyimide prepared in Synthesis example 1:

1. Catalyst: 1 mol of isoquinoline per mole of the amic acid unit of the polyamic acid functioning as the precursor of the highly heat-resistant polyimide.

The following chemical dehydrator and catalyst were added to the polyamic acid solution functioning as the precursor of the thermoplastic polyimide prepared in Synthetic example 6:

1. Chemical dehydrator: 3 mol of acetic anhydride per mole of the amic acid unit of the polyamic acid functioning as the precursor of the thermoplastic polyimide; and 2. Catalyst: 2 mol of isoquinoline per mole of the amic acid unit of the polyamic acid functioning as the precursor of the thermoplastic polyimide.

Hereinafter, an adhesive film was produced as in Example 1. Although the polyamic acid solution functioning as the precursor of the highly heat-resistant polyimide did not contain the chemical dehydrator, it appears that the precursor of the highly heat-resistant polyimide was satisfactorily converted into the self-supporting gel film because of the effect of the chemical dehydrator leached from the polyamic acid solution functioning as the precursor of the thermoplastic polyimide.

Example 7

The following chemical dehydrator and catalyst were added to the polyamic acid solution functioning as the precursor of the highly heat-resistant polyimide prepared in Synthesis example 1:

1. Chemical dehydrator: 3 mol of acetic anhydride per mole of the amic acid unit of the polyamic acid functioning as the precursor of the thermoplastic polyimide; and 2. Catalyst: 1 mol of isoquinoline per mole of the amic acid unit of the polyamic acid functioning as the precursor of the highly heat-resistant polyimide.

The following catalyst was added to the polyamic acid solution functioning as the precursor of the thermoplastic polyimide prepared in Synthetic example 6:

1. Catalyst: 2 mol of isoquinoline per mole of the amic acid unit of the polyamic acid functioning as the precursor of the thermoplastic polyimide.

Hereinafter, an adhesive film was produced as in Example 1. Although the polyamic acid solution functioning as the precursor of the thermoplastic polyimide did not contain the chemical dehydrator, it appears that the precursor of the thermoplastic polyimide was satisfactorily converted into the self-supporting gel film because of the effect of the chemical dehydrator leached from the polyamic acid solution functioning as the precursor of the highly heat-resistant polyimide.

Comparative Example 1

An attempt to produce an adhesive film as in Example 1 was made, except that neither the chemical dehydrator nor the catalyst was added to both polyamic acid solutions. However, after the resulting resin film was heated at 130° C. for 100 seconds, the resulting resin film still had flowability. The resin film was not converted into a self-supporting gel film and thus could not be separated from the endless belt. As a result, an adhesive film was not obtained under the same conditions as in Example 1.

Comparative Example 2

The polyamic acid solution functioning as the precursor of the highly heat-resistance polyimide prepared in Synthetic example 1 and the polyamic acid solution functioning as the precursor of the thermoplastic polyimide prepared in Synthetic example 6 were continuously extruded from a three-layer multi-manifold T-die and cast onto a moving stainless-steel endless belt, which was disposed 20 mm under the T-die, so that the outer layers were composed of the polyamic acid solution functioning as the precursor of the thermoplastic polyimide and the inner layer was composed of the polyamic acid solution functioning as the precursor of the highly heat-resistant polyimide. After the resulting resin film was heated at 130° C. for 500 seconds, the resin film still had flowability. The resin film was not converted into a self-supporting gel film and thus could not be separated from the endless belt. As a result, an adhesive film was not obtained under the same conditions as in Example 1.

Comparative Example 3

The polyamic acid solution functioning as the precursor of the highly heat-resistance polyimide prepared in Synthetic example 1 and the polyamic acid solution functioning as the precursor of the thermoplastic polyimide prepared in Synthetic example 6 were continuously extruded from a three-layer multi-manifold T-die and cast onto a moving stainless-steel endless belt, which was disposed 20 mm under the T-die, so that the outer layers were composed of the polyamic acid solution functioning as the precursor of the thermoplastic polyimide and the inner layer was composed of the polyamic acid solution functioning as the precursor of the highly heat-resistant polyimide. After the resulting resin film was heated at 130° C. for 600 seconds to form a self-supporting gel film. The resulting self-supporting gel film was separated from the endless belt and fixed with tenter clips. The fixed gel film was dried and imidized at 300° C. for 300 seconds, at 400° C. for 300 seconds, and at 450° C. for 60 seconds (total heating time: 1,260 seconds) to form a target adhesive film. However, the resulting adhesive film had many cracks and thus was not usable as an adhesive film for a two-layer FPC.

Comparative Example 4

The polyamic acid solution functioning as the precursor of the highly heat-resistance polyimide prepared in Synthetic example 1 and the polyamic acid solution functioning as the precursor of the thermoplastic polyimide prepared in Synthetic example 6 were continuously extruded from a three-layer multi-manifold T-die and cast onto a moving stainless-steel endless belt, which was disposed 20 mm under the T-die, so that the outer layers were composed of the polyamic acid solution functioning as the precursor of the thermoplastic polyimide and the inner layer was composed of the polyamic acid solution functioning as the precursor of the highly heat-resistant polyimide. After the resulting resin film was heated at 130° C. for 600 seconds to form a self-supporting gel film. The resulting self-supporting gel film was separated from the endless belt and fixed with tenter clips. The fixed gel film was dried and imidized at 200° C. for 300 seconds, 300° C. for 300 seconds, at 400° C. for 300 seconds, and at 450° C. for 60 seconds (total heating time: 1,560 seconds) to form a target adhesive film.

Examples 8-12(5)

Adhesive film laminates were produced as in Example 1 in accordance with Table I below. The Coefficient of Thermal Expansion of the adhesive film and Dimensional stability of the laminate were also measured and are reported in Table I.

TABLE I

| Example | resin for highly heat-resistant polyimide layer | resin for adhesive layer containing a thermoplastic polyimide | Amount of curing agent in resin for highly heat-resistant polyimide layer | | | |
|---|---|---|---|---|---|---|
| | | | chemical dehydrator | | catalyst | |
| | | | example | The amount mole/mole of an amic acid unit in the polyamic acid | example | The amount mole/mole of an amic acid unit in the polyamic acid |
| 8 | synthesis example 1 | synthesis example 7 | acetic anhydride | 2.3 | isoquinoline | 0.5 |
| 9 | synthesis example 1 | synthesis example 7 | acetic anhydride | 2.3 | isoquinoline | 0.65 |
| 10 | synthesis example 1 | synthesis example 7 | acetic anhydride | 3 | isoquinoline | 0.3 |
| 11 | synthesis example 1 | synthesis example 7 | acetic anhydride | 2 | isoquinoline | 0.3 |
| 12 (5) | synthesis example 1 | synthesis example 7 | acetic anhydride | 2 | isoquinoline | 1 |

| Example | Amount of curing agent in resin for adhesive layer containing a thermoplastic polyimide layer | | | | CTE (ppm) | | Dimension (%) | |
|---|---|---|---|---|---|---|---|---|
| | chemical dehydrator | | catalyst | | | | | |
| | example | The amount mole/mole of an amic acid unit in the polyamic acid | example | The amount mole/mole of an amic acid unit in the polyamic acid | MD | TD | MD | TD |
| 8 | acetic anhydride | 0 | isoquinoline | 0 | 21.2 | 22.4 | −0.12 | −0.04 |

TABLE I-continued

| | | | | | | | | |
|---|---|---|---|---|---|---|---|---|
| 9 | acetic anhydride | 0 | isoquinoline | 0 | 17.8 | 19.6 | | |
| 10 | acetic anhydride | 0 | isoquinoline | 0 | 19.8 | 22.2 | −0.06 | 0.02 |
| 11 | acetic anhydride | 0 | isoquinoline | 0 | 22.1 | 23.5 | | |
| 12 (5) | acetic anhydride | 2 | isoquinoline | 2 | 15.4 | 17 | | |

The Coefficient of Thermal Expansion of the Adhesive Film and Dimensional Stability of Flexible Copper-clad Laminate were Measured as Follows.

Coefficient of Thermal Expansion Measurement

Apparatus: TMA8140 made by Rigaku Electronic Corporation

Temperature profile: 20° to 400° C.

Heating rate: 10° C./min

Sample size: 5×20 mm

In order to remove the influence of shrinkage by heat, measurements were repeated twice at the above-mentioned temperature profile and then the average coefficient of thermal expansion at 100° to 200° C. was calculated from the second chart.

Measurement of Dimensional Stability of Flexible Laminate

An 18 μm rolled copper foil (BHY-22B-T, produced by Japan Energy Corporation) was laminated on each side of the resulting adhesive film, and then a protective material (Apical 125NPI produced by Kaneka corporation) was laminated on each copper foil at a lamination temperature of 360□, a lamination pressure of 196 N/cm (20 kgf/cm), and a lamination rate of 1.5 m/min. A flexible copper-clad laminate (FCCL) was obtained as a result.

Four holes were formed in a FCCL and the distance between the holes was measured according to Japanese Industrial Standards (JIS) C6481. The laminate was then etched to remove the metal foil from the flexible laminate, and the resulting laminate was left to stand in a thermostatic chamber at 20° C. and 60% RH for 24 hours. The distance between the four holes was again measured in the same manner as before the etching. The ratio of change in dimensions was calculated based on the equation below:

ratio of change in dimension (%)={(D2−D1)/D1}×100 wherein D1 is the observed distance between the holes before the removal of the metal foil and D2 is the observed distance between the holes after the removal of the metal foil.

The ratio of change in dimensions was measured in both the MD and TD directions.

As described above, it is possible to provide the adhesive films by the processes for producing the adhesive films in Examples in production times significantly shorter than those in the processes for producing the adhesive films in Comparative examples.

The process for producing the adhesive film according to the present invention has been described above. The present invention is not limited to the above-described embodiments and examples. The present invention includes various modifications without departing from the spirit of the present invention.

A process for producing an adhesive film using a chemical dehydrator and a catalyst dramatically improves the productivity of the adhesive film compared with that in a conventional coextrusion casting process including thermal cure step. As a result, it is possible to provide the adhesive film at low cost.

What is claimed is:

1. A process for producing an adhesive film, comprising:
laminating an adhesive layer comprising a thermoplastic polyimide onto at least one surface of a highly heat-resistant polyimide layer by coextrusion casting method by coextruding a precursor solution of the highly heat-resistant polyimide with a precursor of the thermoplastic polyimide, wherein when charged into an extruder for the coextrusion process, the precursor solution of the highly heat-resistant polyimide contains both a chemical dehydrator and a catalyst, and the precursor of the thermoplastic polyimide does not contain a catalyst or a chemical dehydrator.

2. The process for producing an adhesive film according to claim 1, wherein 0.5 to 5 mol of the chemical dehydrator is contained per mole of the amic acid unit of the polyamic acid in the solution containing the chemical dehydrator and the catalyst.

3. The process for producing an adhesive film according to claim 1, wherein 0.7 to 4 mol of the chemical dehydrator is contained per mole of the amic acid unit of the polyamic acid in the solution containing the chemical dehydrator and the catalyst.

4. The process for producing an adhesive film according to claim 1, wherein 0.05 to 3 mol of the catalyst is contained per mole of the amic acid unit of the polyamic acid in the solution containing the chemical dehydrator and the catalyst.

5. The process for producing an adhesive film according to claim 1, wherein 0.2 to 2 mol of the catalyst is contained per mole of the amic acid unit of the polyamic acid in the solution containing the chemical dehydrator and the catalyst.

6. The process for producing an adhesive film according to claim 1, wherein the resulting laminate is a two layer laminate of one thermoplastic polyimide layer and one highly heat-resistant polyimide layer.

7. The process for producing an adhesive film according to claim 1, wherein the resulting laminate is a three layer laminate of two outer thermoplastic polyimide layers and one inner highly heat-resistant polyimide layer.

8. The process for producing an adhesive film according to claim 1, wherein the chemical dehydrator is selected from the group consisting of aliphatic acid anhydride and the aromatic acid anhydride.

9. The process for producing an adhesive film according to claim 1, wherein the catalyst is selected from the group consisting of imidazole, benzimidazole, isoquinoline, quinoline, and β-picoline.

10. A process for producing an adhesive film laminate comprising at least one a highly heat-resistant polyimide layer and at least one thermoplastic polyimide, the laminate being prepared within predetermined thickness parameters for the layers, and the laminate having a target predetermined coefficient of thermal expansion comprising:
a) identifying a target predetermined coefficient of thermal expansion for the adhesive film laminate;

b) formulating a precursor of a thermoplastic polyimide wherein the precursor of the thermoplastic polyimide does not contain a catalyst or a chemical dehydrator;

c) formulating a precursor solution of a highly heat-resistant polyimide wherein the precursor solution of the highly heat-resistant polyimide contains both a chemical dehydrator and a catalyst;

d) based on the formulations in steps b) and c) and the predetermined thickness parameters of the layers, formulating an amount of a chemical dehydrator and a catalyst to be contained in the precursor solution of the highly heat-resistant polyimide to provide an adhesive film laminate having the target predetermined coefficient of thermal expansion for the adhesive film laminate; and e) laminating at least one adhesive layer comprising a thermoplastic polyimide onto at least one surface of a highly heat-resistant polyimide layer by coextrusion casting the precursor solution of the highly heat-resistant polyimide and the solution containing a precursor of the thermoplastic polyimide as formulated in step d).

11. The process for producing an adhesive film laminate according to claim 10, wherein the target predetermined coefficient of thermal expansion of the laminate matches the coefficient of thermal expansion of a metal foil to which the laminate is to be laminated.

12. The process for producing an adhesive film laminate according to claim 11, wherein the metal foil comprises copper.

13. A process for producing an adhesive film, comprising: laminating an adhesive layer comprising a thermoplastic polyimide onto at least one surface of a highly heat-resistant polyimide layer by coextrusion casting method by coextruding a precursor solution of the highly heat-resistant polyimide with a precursor of the thermoplastic polyimide, wherein when charged into an extruder for the coextrusion process, the precursor solution of the highly heat-resistant polyimide contains both a chemical dehydrator and a catalyst, and the precursor of the thermoplastic polyimide does not contain a chemical dehydrator.

* * * * *

UNITED STATES PATENT AND TRADEMARK OFFICE
CERTIFICATE OF CORRECTION

| | |
|---|---|
| PATENT NO. | : 7,678,315 B2 |
| APPLICATION NO. | : 11/601267 |
| DATED | : March 16, 2010 |
| INVENTOR(S) | : Masami Yanagida et al. |

Page 1 of 1

It is certified that error appears in the above-identified patent and that said Letters Patent is hereby corrected as shown below:

Claim 10 (Column 18, Line 61):

"...comprising at least one a highly heat-resistant polyimide..." should be --...comprising at least one highly heat-resistant polyimide...--

Signed and Sealed this

Fourth Day of May, 2010

David J. Kappos
*Director of the United States Patent and Trademark Office*